United States Patent [19]
Klees

[11] Patent Number: 5,761,899
[45] Date of Patent: Jun. 9, 1998

[54] SUPERSONIC ENGINE APPARATUS AND METHOD WITH EJECTOR/SUPPRESSOR

[75] Inventor: Garry W. Klees, Mercer Island, Wash.

[73] Assignee: The Boeing Company, Seattle, Wash.

[21] Appl. No.: 438,683

[22] Filed: May 11, 1995

[51] Int. Cl.⁶ .................................................. F02K 3/02
[52] U.S. Cl. ...................... 60/204; 60/230; 60/262; 239/265.13; 239/265.17
[58] Field of Search ............... 60/204, 262, 269, 60/232, 242, 230; 239/265.13, 265.17, 265.11, 265.19

[56] References Cited

U.S. PATENT DOCUMENTS

| | | | |
|---|---|---|---|
| 2,938,335 | 5/1960 | Cook | 239/265.13 |
| 2,952,124 | 9/1960 | Pearson | 239/265.13 |
| 3,057,150 | 10/1962 | Horgan. | |
| 3,333,772 | 8/1967 | Bruner. | |
| 3,346,193 | 10/1967 | Tumicki. | |
| 3,409,228 | 11/1968 | Mehr. | |
| 3,493,178 | 2/1970 | Bruner. | |
| 3,587,973 | 6/1971 | Wolf. | |
| 3,806,035 | 4/1974 | Calder | 239/265.17 |
| 4,052,847 | 10/1977 | Rodgers et al. | 60/262 |
| 4,909,346 | 3/1990 | Torkelson | 60/262 |
| 5,154,052 | 10/1992 | Giffin et al. | 60/262 |
| 5,216,878 | 6/1993 | Klees | 60/262 |
| 5,222,359 | 6/1993 | Klees et al. | 60/262 |
| 5,269,139 | 12/1993 | Klees | 60/262 |
| 5,463,866 | 11/1995 | Klees | 60/262 |

*Primary Examiner*—Michael Koczo
*Attorney, Agent, or Firm*—Robert B. Hughes; Hughes, Multer & Schacht

[57] ABSTRACT

A supersonic engine having an ejector/suppressor. The engine has a rear discharge portion with an ambient air inlet section, a mixing section, and a rear discharge section. For noise suppression, arms mounted in the air inlet section are moved to open air inlet passageways causing air to flow there through. Primary exhaust from the engine flows through primary passageways interspersed with the ambient air passageways. The primary supersonic air from the primary passageways mixes with the ambient air in the mixing section and flows out the final nozzle which is in the open position. For cruise mode, the arms are moved to close the air inlet passageways, and the final nozzle is in a position to cause the flow upstream thereof to be a subsonic, and the flow aft of the final nozzle to be supersonic. The arms can be placed in an intermediate position for thrust reversal, with the final nozzle being moved a blocking position.

20 Claims, 5 Drawing Sheets

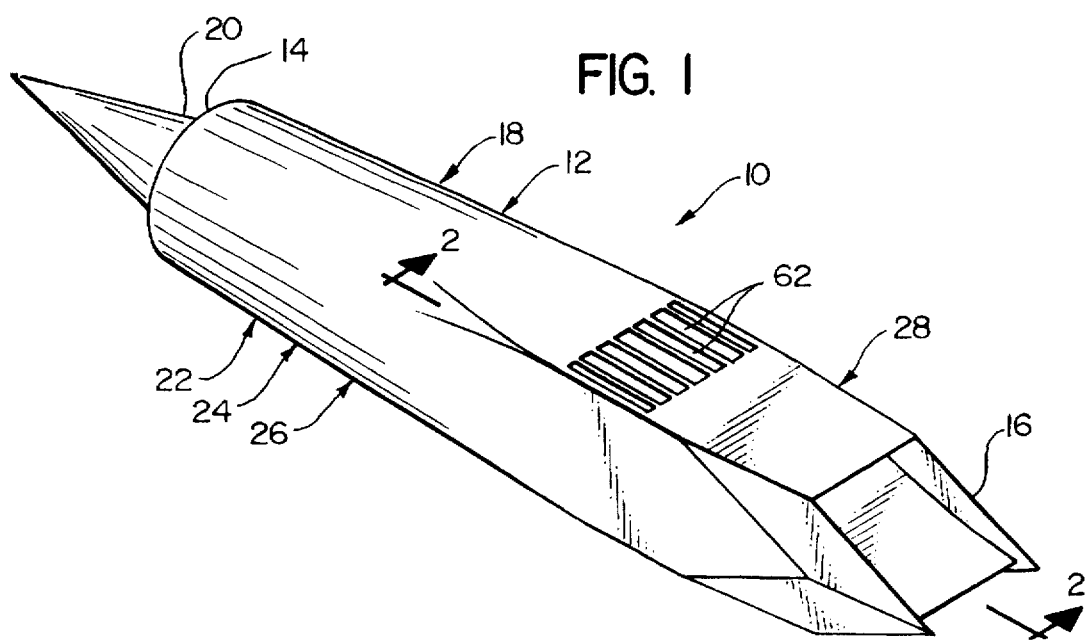

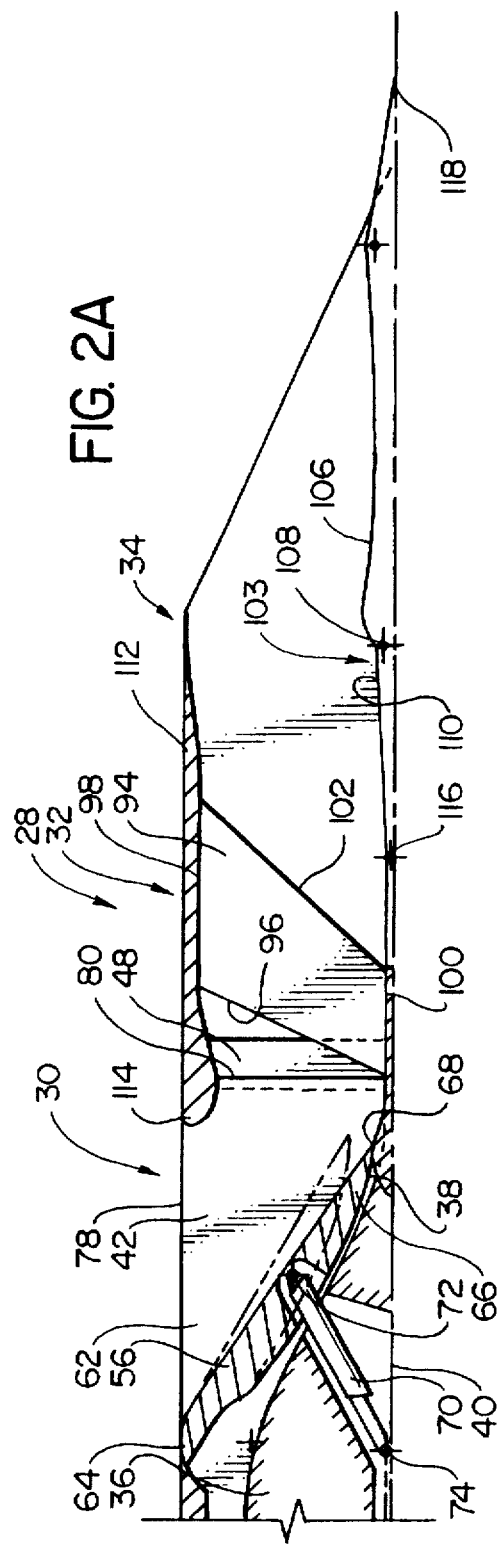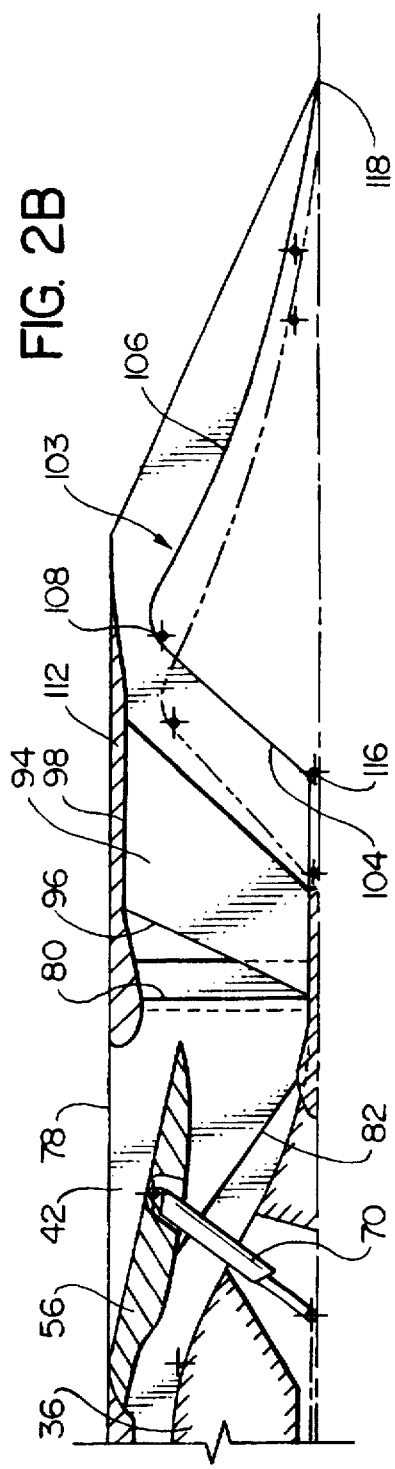

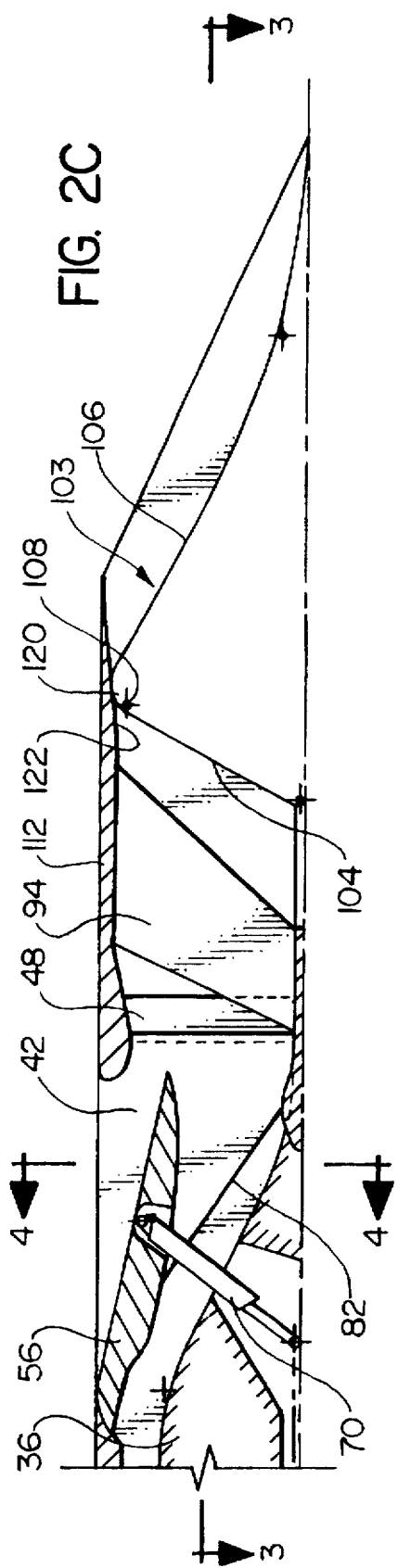

SUPERSONIC ENGINE APPARATUS AND METHOD WITH EJECTOR/SUPPRESSOR

The present invention relates to a jet engine assembly with an ejector/suppressor nozzle, and also to a method for the same. More particularly it relates to such an engine having a semi-stowable two dimensional ejector/suppressor nozzle.

BACKGROUND OF THE INVENTION

One of the critical problems in designing environmentally acceptable engines for supersonic aircraft is that of jet noise during take-off, climb and landing. Over the last several decades, there have been various approaches to alleviate jet noise in supersonic engines. For example, acoustic panels are used to attenuate the noise, and there are various devices for mixing ambient air with the jet exhaust during operating modes where noise alleviation is required. The ejectors are utilized to mix ambient air with the engine exhaust, and the air is sometimes introduced through blow-in doors in the aft portion of the engine nacelle, or through an oversized main inlet.

Ejector/suppressor nozzles are currently the favored method for obtaining adequate noise suppressing for a supersonic commercial transport. However, there are significant design problems in providing the nozzle with the apparatus to introduce the ambient air with the primary exhaust for the noise suppressing mode of operation, and yet to provide for the desired flow of primary engine exhaust for supersonic mode of operation, while maintaining the overall engine diameter within desired design limits and avoid undue complexity in the noise suppression related apparatus.

A search of the U.S. patent literature has disclosed a number of patents, and these are listed below.

U.S. Pat. No. 3,333,772 (Bruner) shows a discharge nozzle which in the cruise configuration defines a substantially continuous through passageway for the engine exhaust. This is an axi-symmetric nozzle where there is an axially translating sleeve to open air passageways leading into a mixing area to mix with the engine exhaust. For operation in the vicinity of an airfield, to reduce the noise, the sleeve 20 is moved forwardly and sets of flaps within the nozzle are rotated to direct a portion of the engine exhaust radially outwardly into ducts 8. Ambient air is drawn into the annular opening created by the forward movement of the sleeve 20, and this air flows into the space between the ducts 8 to flow through a final duct or nozzle element formed by the elements 26-27.

U.S. Pat. No. 3,057,150 (Horgan) discloses a two dimensional nozzle for a jet engine where there are upper and lower sets of blow-in doors 102/104 and 106/108, respectively, which in the noise suppressing mode move inwardly to open passageways through which the ambient air flows to mix with the exhaust. The flaps 123 can be swung about a forward pivot point inwardly (see broken lines position of FIG. 4) for thrust reversal, with the reverse thrust then flowing out the passageways provided by the flaps 102/104 and 106/108.

U.S. Pat. No. 3,409,228 (Mehr) discloses a supersonic jet engine where there is provided around the aft portion of the engine nacelle ramp flaps 34 which can be pivoted inwardly so that ambient air is drawn into the exhaust nozzle for subsonic operation.

U.S. Pat. No. 3,346,183 (Tumicki) shows a "supersonic ejector type exhaust nozzle", where there are blow-in doors 40 which in subsonic flight are moved radially inwardly to permit ambient air to be drawn into the nozzle to pass outwardly through the final nozzle 42.

U.S. Pat. No. 3,493,178 (Bruner) discloses an ejection type nozzle for a jet aircraft, where there is an outer ring member 20 which can be moved to a forward position to open inlets 62 positioned around the circumference of the engine nacelle. Flaps 52 which are positioned around the engine exhaust passageway can be pivoted inwardly to divert engine exhaust radially outwardly to intermix with the ambient air which is drawn in through the opening 62.

U.S. Pat. No. 3,587,9073 (Wolf et al) discloses a supersonic engine where there are provided blow-in doors 38 to admit ambient air. Also, the flaps that form the primary nozzle are swung to a divergent position and sectors having a plurality of tubes are positioned in the exhaust stream.

SUMMARY OF THE INVENTION

The present invention comprises a supersonic jet engine assembly having a forward to rear longitudinal axis, a front end, and a rear end. The assembly also provides a primary flow path from the forward end to the rear end of the engine.

The engine comprises a main engine portion, and a rear discharge portion having a forward end to receive primary flow from the forward engine portion and a rear outlet end. The discharge portion comprises an ambient air inlet section, a mixing section, and a discharge section.

The ambient air inlet section in turn comprises a plurality of longitudinally aligned passageway plates which are spaced laterally from one another. Adjacent pairs of these plates define flow passageways, some of which are primary flow passageways and others being ambient air passageways. These primary flow and ambient air passageways are positioned in an interspersed pattern relative to one another.

The ambient air inlet section also comprises air inlet openings positioned and arranged in the nacelle to admit ambient air into the ambient air inlet section, with each of the openings admitting ambient air into a related one of said ambient air passageways. There is a plurality of arms mounted at the ambient air inlet section, and these arms are moveable between a first position blocking flow of ambient air into the ambient air passageways but permitting primary flow through the ambient air passageways, and a second position permitting ambient air to flow through the ambient air openings and the ambient air passageways, into the mixing chamber while at least partially blocking primary flow through the ambient air passageways. Also, there is means to move these arms between the first and second positions.

The mixing section is positioned behind the ambient air inlet section. This is arranged to receive primary flow and ambient air flow from the ambient air inlet section, while said arms are in the second position. The mixing section is also arranged to receive primary flow from both the primary flow passageways and the ambient air passageways when the arms are in the first position.

The discharge section has a discharge passageway portion to receive flow from the mixing section. This discharge section has variable area passageway means arranged to vary the area of the discharge passageway portion so as to provide a more open position for mixed flow of ambient air and primary flow for operation in a mixed flow noise suppressing mode of operation, and also to provide a convergent/divergent configuration for supersonic mode of operation.

In the preferred form, each of the arms in the first position is positioned in a related inlet opening in the nacelle. Each of the arms has a forward end and a rear end, and each arm is moveable in a manner that the forward end of each arm remains adjacent to the engine nacelle, while a rear portion of the arm moves toward and away from a center location of said engine assembly.

Further, in the preferred form, each of the passageway plates has a leading edge that slants from a forward location further from a center location of the engine assembly inwardly toward a location closer to the center location of the engine assembly. The arms in the second position are adjacent to the leading edges of the adjacent passageway plates to divert primary flow from the ambient air passageways into the primary flow passageways.

Each of the passageway plates has a rear end, and the assembly further comprises means at the rear edges of the passageway plates to form convergent/divergent passageways to provide choked flow of the primary flow through the primary flow passageways with the arms in the second position. A preferred form of this means is a plurality of plug elements, each positioned adjacent to a rear end portion of the related primary flow passageway. Each plug element defines with adjacent surfaces of the passageway plates the convergent/divergent flow paths. In the preferred form, the plug elements are stationary.

Also, in the preferred form, the arms are such that end surface portions thereof are arranged so that with the arms being moved a short distance from the second position, a convergent/divergent passageway means is defined by said arms with adjacent surfaces to permit primary flow adjacent to the arm end portions and into the ambient air passageways.

The assembly is further arranged so that the arms can be positioned in a third intermediate position between the first and second positions. In this position, the ambient air passageways are partially open to primary flow, and the ambient air inlet openings are also open. There is means to block flow of the primary flow from the discharge section, so that primary flow is directed by the arms through the ambient air passageways and out of said ambient air openings for thrust reversal.

For noise alleviation, there are longitudinally aligned acoustic panels positioned in the mixing section, with each of the panels being longitudinally aligned with a related ambient air opening passageway.

Also, in the preferred form the discharge section comprises upper lower variable area surface means having a noise suppressing position located adjacent to a center area of the discharge section to provide a larger flow exit area and moveable outwardly from the center location to define the convergent/divergent configuration. A specific form of the surface means comprises a forward panel and a rear panel connected to one another at adjacent edge portions thereof. Each pair of panels is pivotally connected to one another to deflect from the center position to a convergent/divergent configuration.

The preferred configuration of the arms is that each has an outer generally planar surface portion, with the arms in the first position forming an outer surface contour of the engine assembly. The arms have a rounded inwardly facing surface which in the second position provides a leading edge with adjacent passageway panels to cause the primary flow to be directed through the primary flow passageways.

In the method of the present invention, the engine assembly is provided as indicated above. In the noise suppressing mode, the arms are positioned in the second position to direct primary exhaust through the primary exhaust passageways while substantially blocking flow of primary flow through the ambient air passageways. The discharge section is positioned to the more open position to receive mixed flow of ambient air and primary flow.

For supersonic motive operation, the method comprises positioning the arms in the first position to substantially block flow of ambient air into the ambient air passageways. The discharge section is positioned in the convergent/divergent configuration, so that there is primary subsonic flow through both the primary flow passageways and the ambient air passageways, with the flow becoming choked in the discharge section and exiting as supersonic flow.

Other specific features of the method of the present invention are discussed more specifically in the following detailed description, as are other features of the engine assembly of the present invention.

BRIEF DESCRIPTION OF THE DRAWINGS

FIG. 1 is an isometric view of a supersonic jet engine assembly of the present invention;

FIGS. 2A through 2C are each longitudinal sectional views (taken along a vertical plane) showing the upper rear discharge portion of the engine of FIG. 1 in three different operating modes, with FIG. 2A showing the engine in its noise suppressing cruise mode, FIG. 2B showing the engine in its non-noise suppressing mode, and FIG. 2C showing the engine in its thrust reversing mode.

Figure 3:
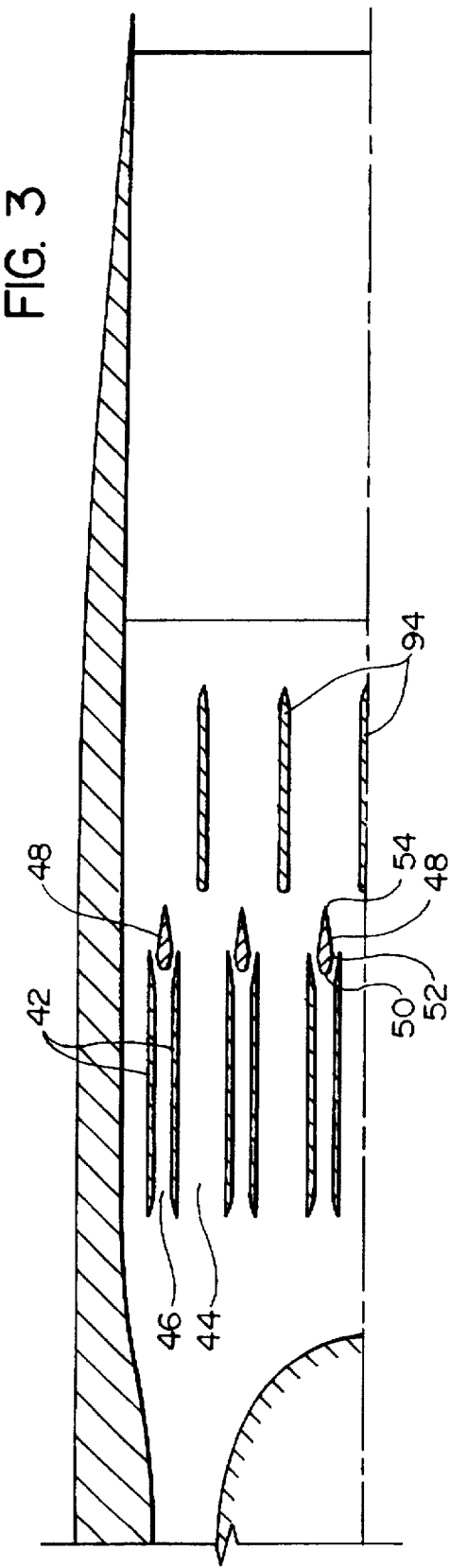
FIG. 3 is a longitudinal sectional view taken along line 3—3 of FIG. 2C, showing only the discharge section of the engine of FIG. 1.

DESCRIPTION OF THE PREFERRED EMBODIMENT (a) General Description

The engine assembly 10 of the present comprises a nacelle 12, having an inlet end 14 and a rear exhaust end 16. This engine assembly further comprises a forward main engine assembly portion 18 comprising an inlet section 20, a compressor section 22, a combustion section 24, and a turbine section 26. Since each of these components 20 through 26 is, or may be, of conventional design, these are not shown in detail herein. Rather, each of the sections 20–26 is simply indicated at its approximate location in the nacelle 12. As is common in the prior art, the inlet section 20 takes in ambient air in supersonic flight, and causes the supersonic inflow of air to go subsonic, and be directed into the compressor section 22 and to the combustion section, with the exhaust from the combustion section being directed to the turbine. The engine can be a straight jet, or it can be a by-pass jet engine.

Rearwardly of the forward engine assembly portion 18 is a rear discharge portion 28 which is positioned and arranged to receive the primary exhaust from the forward engine assembly portion 18, this primary exhaust being either the engine exhaust alone (with a straight jet engine), or a mixed flow of engine exhaust and by-pass air (with a by-pass engine). With reference now to FIGS. 2A–2C, the rear discharge portion 28 can be seen to comprise an ambient air inlet section 30, a mixing section 32, and a discharge section 34.

The forward engine assembly portion 18 is as an axi-symmetric engine, with the compressor and turbine having a circular configuration and rotating about the longitudinal center axis. The rear discharge portion 28 is configured in a two dimensional configuration, and the rear end of the forward engine assembly portion 18 and the forward part of the rear discharge portion 28 are configured to provide a transition from the axi-symmetric to the two dimensional configuration.

The turbine section 26 has at its aft end a center member or plug 36 which has at its forward end a circular cross-sectional figuration, and then transitions so it has an end edge portion 38 that extends horizontally and transversely across the nacelle interior 38 at a center plane indicated at 40.

(b) The Ambient Air Inlet Section 30

The ambient air section 30 comprises a plurality of longitudinally and vertically aligned passageway defining plates 42 which are spaced transversely from one another to define ambient air passageways 44 and primary exhaust passageways 46, with these passageways 44 and 46 being interspersed with one another in an alternating pattern. Thus, as can be seen in FIG. 3, each pair of plates 42 which are positioned more closely to one another defines a primary exhaust passageway 46, while each pair of plates 42 which are spaced further away from each other defines an ambient air passageway 44.

At the rear end of each primary exhaust passageway 46, there is positioned a related stationary elongate plug member 48 which is vertically aligned with, and centered on, its related passageway 46. Each plug member 48 is substantially uniform in horizontal cross-sectional configuration and has a blunt nose portion 50 which leads into two rounded side surface portions 52, with these side surfaces 52 tapering inwardly and rearwardly to a rear edge 54. Thus, it can be seen that each plug element 48 forms with the rear end of each adjacent pair of plates 42 a convergent/divergent exhaust nozzle for its related passageway 46. It should be noted that in the supersonic engine, the exhaust pressure is sufficiently high in the order of 4 to 6 atm. A high efficiency convergent/divergent primary nozzle is required to minimize thrust loss during suppression mode. A plug nozzle as provided at 48 approaches the ideal convergent/divergent nozzle in efficiency.

As will be disclosed later herein in the description of the various modes of the operation of the engine assembly 10, during the noise suppressing mode of operation where ambient air flows through the ambient air passageways 44, these plug members 48 (each creating a convergent/divergent nozzle) cause the flow of primary exhaust through each passageway 46 to go supersonic as it is exiting from the exit end of the primary passageway 46 and passing by the related plug member 48. In the non-noise suppressing mode of operation, when there is primary exhaust flow through both sets of passageways 44 and 46, the flow from the primary exhaust passageway 46 is subsonic.

Figure 4:
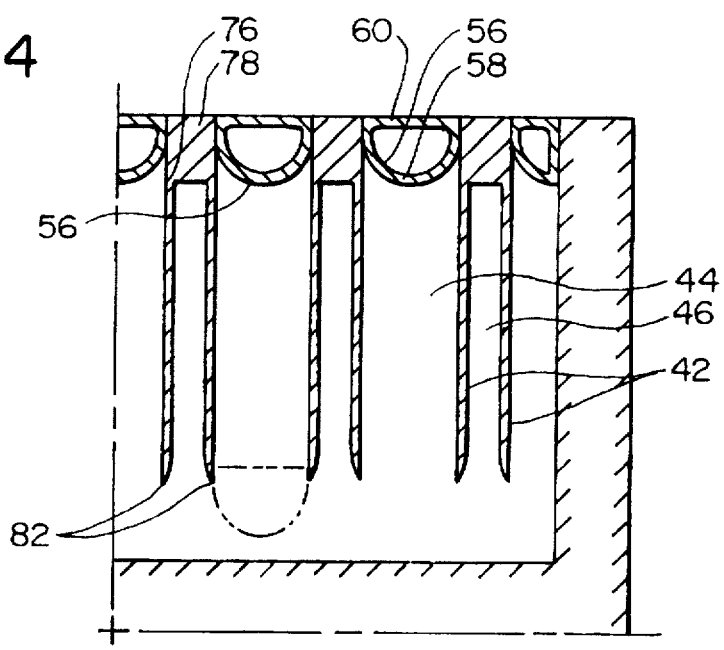
FIG. 4 is a sectional view along line 4—4 of FIG. 2C, showing one of the arms in the ambient air inlet section in its noise suppressing position, and showing only a portion of the arm in its position closing the ambient air inlet.

The ambient air intake section 30 also comprises a plurality of arms 56, there being one arm for each of the ambient air passageways 44. As can be seen in FIG. 4, each arm 56 has in transverse section a semi-circular configuration, which comprises a semi-circular wall portion 58, the end edges of which connect to a planar plate section 60. When the arms 56 are in the noise suppressing mode of FIG. 2A, each arm 56 is positioned to open a related ambient air inlet opening 62. It can be seen in FIG. 1 that a plurality of these openings 62 are positioned at laterally spaced locations over the surface of the nacelle 12 at the upper surface, and a similar set of openings 62 is positioned along the lower nacelle surface 12. In the closed position of FIG. 2B (and also in FIG. 1), each opening 62 is closed by the rear planar plate 60 of each arm 56, so that the plate sections 60 form part of the outer aerodynamic contour of the nacelle 12.

Each arm 56 is pivotally mounted at its forward end 64 at a location proximate to the forward edge of its related opening 62. Each arm 56 is movable from its outer non-noise suppressing mode position radially inwardly about its forward pivot end 64 so that its rear end portion 66 is positioned closer to the horizontal center plane 40 of the two dimensional rear discharge portion 28 of the engine assembly 10 (as shown in FIG. 2A). As will be described more fully hereinafter, the arms 56 can also be moved to an intermediate location, as shown in FIG. 2B, for the thrust reversing mode of operation.

The rear end portion of each arm 56 has its wall portion tapering in a curved configuration to form with the rear edge of the related plate section 60 an edge 68. To move the arms 56 to their various operating positions, there is provided for each arm 56 a related actuating rod 70 pivotally connected at 72 at a mid location of the related arm 56, and having its opposite end 74 mounted to stationary structure at a mid-location in the engine for and aft movement. Thus, it can be seen that by moving the end 74 of the rod 70 rearwardly, the arm 56 is moved outwardly to its stowed position closing its opening 62, and by moving the rod end 74 forwardly, the arm 56 is swung toward the inner noise suppressing position.

Each of the passageway defining plates 42 has the general configuration of a right triangle, with one outer edge 76 being located adjacent to fixed structure 78 (see FIG. 4). A second vertical rear edge 80 of each plate 42 tapers in a manner that the surface portions forming the engine passageway of each primary exhaust passageway 46 diverge in a rounded configuration, so as to form with the outer surfaces of its related plug member 48 a properly contoured converging/diverging passageway for the primary exhaust.

The third edge 82 of each plate 42 can be considered the hypotenuse edge, and as can be seen in FIG. 4, this edge 82 is tapered in a direction toward its related ambient air passageway 44. Each edge 82 extends from an outer end location proximate to the forward edge of the nacelle ambient air opening 62 at an inward and rearward slant toward the center plane 40 of the rear discharge portion 28 of the engine assembly 10. Thus, it can be seen that with each arm 56 positioned in its full inward position (see FIG. 2A), the outer side edge portions of its semi-circular plate 58 are positioned against the slanted edge portions 82 of related two plates 52 so that the flow of primary exhaust is (as shown in FIG. 4) around the forward plate section 58 of the arm 56 and into the primary exhaust passageways 46.

(c) The Mixing Section 32

Figure 5:
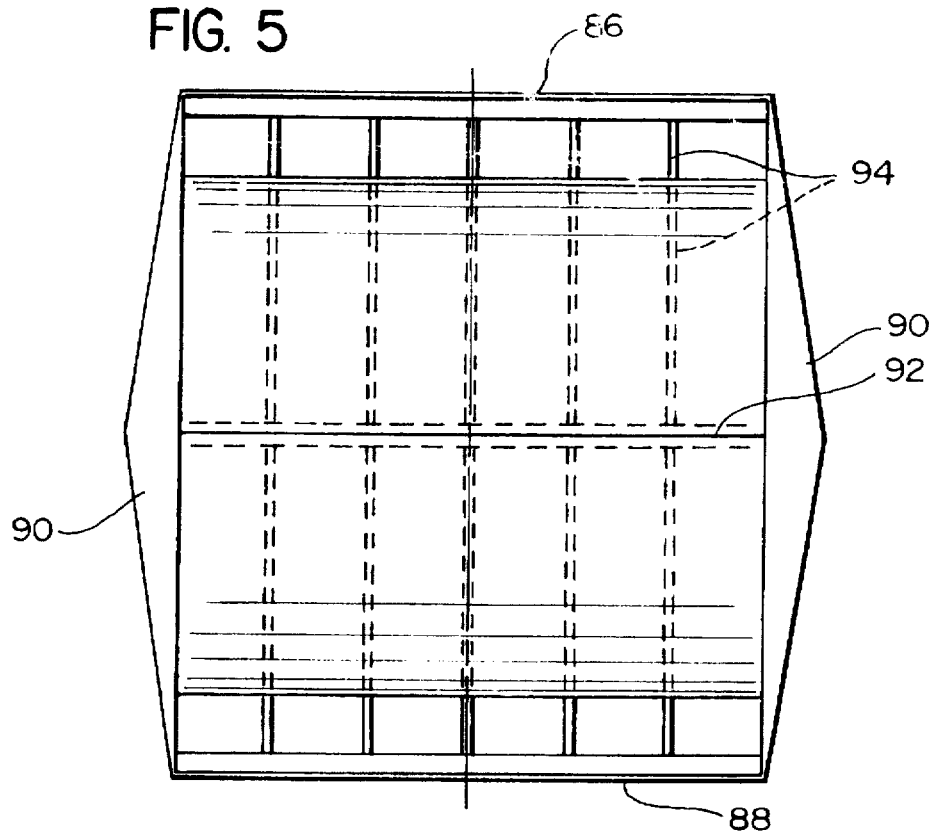
FIG. 5 is a rear elevational view of the engine of FIG. 1.

Let us first turn our attention to certain aspects of the overall configuration of the nacelle 12, it can be seen in FIG. 1 that the forward portion of the nacelle 12 has a circular configuration and the rear end of the nacelle 12 has a rectangular configuration. This round inlet-square nozzle configuration is presently believed to be a rear-optimum configuration. Thus, with reference to FIG. 5, it can be seen that the rear portion of the nacelle 12 comprises an upper wall 86, a lower wall 88, and two side walls 90. Also, there is a center line splitter plate 92 extending between the two side walls 90 at the mid-height thereof. This splitter plate 92 acts as a structural brace for the side walls 90 and is carried through the length of the rear discharge portion 28 of the engine assembly 10.

Positioned within the mixing section 32 is a plurality of vertically and longitudinally aligned splitter plates 94 spaced laterally from one another, with each splitter plate 94 being centered with respect to a related ambient air passageway 44. Each splitter plate 94 has a generally trapezoidal configuration, with a slanting vertical forward edge 96, a longitudinally aligned outer edge 98, a lower edge 100 connected to the center line splitter place 96, and an outwardly and rearwardly extending rear edge 102. All available surfaces in the mixing section 32 are acoustically treated, including the interior surfaces of the upper, lower and side walls 86, 88 and 90, as well as the center plate 92 and splitter plates 94, and also surfaces in the discharge section 34.

It should be understood that mixing noise is generated by the high velocity primary jet, whether it is exhausting to ambient or being mixed internally. A major advantage to this invention is the availability of surface area which can be acoustically treated. Treated areas shown are currently what is considered to be required to meet stage 4 noise requirements.

It is to be understood, of course (as stated earlier) that the upper and lower portion of the rear discharge section 28 are substantially identical to one another, and the upper portion only is shown, mainly as a matter of convenience.

(d) The Discharge Section 34

The discharge section 34 has a center plug 103 formed on opposite sides of the center splitter plate 92 by forward and rear panels 104 and 106, respectively, with these panels being pivotally connected to one another at a mid-location 108. These panels 104/106 are also acoustically treated. By moving each pair of panels 104 and 106 relative to one another so as to cause the surface area at the pivot connection 108 to move outwardly from the center plane 40 of the splitter plate 92, these form a variable nozzle section. It will be noted that the rear surface portion 110 of the forward panel 104 has a somewhat rounded configuration to provide a properly rounded surface configuration for the proper flow of gaseous exhaust in the outward position of panels 104/106.

Also, there are upper and lower end plates 112 which are pivotally mounted at their forward ends 114 to provide the area adjustable shroud of the final nozzle. It is possible that these upper and lower plates 112 could be translated longitudinally, as well as being pivoted outwardly and inwardly to provide throat area control.

In the preferred configuration, the forward edge 116 of each of the two panels 104 remains adjacent to the center line splitter plate 92 and can be moved fore and aft. In like manner, the rear edge 118 of each rear plate 106 also remains adjacent to the center splitter plate 92 and can also be moved fore and aft a limited amount. In this manner, not only can the rounded surface portion of the variable area plugs 104/106 be moved outwardly to control throat area, but this rounded surface portion 110 can be moved fore and aft to a limited extent.

It will be noted that this final nozzle configuration is arranged in a manner that it minimizes the internal supersonic scrubbing drag. Further, it helps the ground clearance problem at rotation.

(e) The Operation of the Present Invention

To describe the operation of the present invention, reference is now made to FIGS. 2A, 2B and 2C, showing the three main operating modes of the present invention.

(i) The Noise Suppressing Mode

With reference to FIG. 2A, this shows the assembly 10 in its noise suppressing mode, which would normally be employed when the airplane is taking off, landing, or in early climb, where noise alleviation is critical. In this configuration, the upper and lower sets of arms 56 (with only the upper pair of arms 56 being shown, as indicated above) are rotated toward the center plane 40 so that each arm substantially entirely closes off its related ambient air passageway 44 from the primary engine exhaust. Thus, the engine exhaust is directed into the exhaust passageways 46. The flow of engine exhaust at this time is at a rather high pressure and temperature, with the flow in the passageways 46 being subsonic. As the engine exhaust passes by the plug members 48, the engine exhaust flow goes supersonic as it proceeds into the mixing chamber of the mixing section 32.

At the same time, ambient air is drawn into the upper and lower air intake openings 62 to flow through the ambient air passageways 44 and into the mixing chamber of the mixing section 32. The supersonic primary flow and the ambient air flow are mixed with one another, with the acoustic treatment of the plates 94 and the other exposed surfaces in the mixing chamber providing a certain amount of noise attenuation. At this time, the two sets of plates 104 and 106 that form the plug 103 are (as shown in FIG. 2A) positioned against the center line splitter plate 92 so as to provide maximum flow area for the mixed flow of primary exhaust and ambient air. Also, in this mode of operation, the position of the arms 56 can be adjusted so that these can be used as a trimmer nozzle (as shown in the broken line position of FIG. 2A), in essence providing variable primary nozzle area during suppression mode.

Under high flow conditions, the arms 56 can move to a somewhat open position, thus reducing the primary duct area requirement (and also permitting the use of fixed plug members 48). The majority of the exhaust flow will travel through the fixed nozzles provided by the fixed plug members 48, and will provide shock-cell noise reduction. The remainder of the flow will travel through what is similar plug-nozzle geometry that results from moving the arms 56 up a short distance, as shown in the broken lines of FIG. 2A. Thus, all of the exhaust gas will have shock-cell noise control. However, under high primary exhaust flow conditions, the aspirated flow will be reduced slightly because of the blockage created by the upward positioning of the arms 56. It is to be noted however that the condition requiring maximum aspiration requires the smallest throat area. Thus, during a high power mode of operation, such as take-off and initial climb, the arms 56 would be in the fully closed or nearly fully closed position, thus providing maximum aspiration of ambient air. It is only under cutback or approach conditions that aspiration will be reduced. The aspiration ratio, however, may remain constant, or actually it may increase because engine flow also reduces as power is reduced, the suppression that is required during these modes is not as great.

(ii) The Non-noise Suppressing Operating Mode

Let it be assumed that the supersonic airplane has completed take-off and initial climb and has reached an elevation and/or location where further noise suppression is not required.

Thus, it is desired to make the transition from the high powered suppression mode where the arms 56 are deployed fully in their blocking, sound suppressing position to the fully non-blocking position where the arms 56 close the air inlet opening 62 in the nacelle. Initially, the plug elements (made up of the two pairs of panels 104 and 106) are moved outwardly toward a choking position. At such time as the moveable plug elements 104–106 are just beginning to choke, so that the upstream flow around the nozzle panels 104–106 is subsonic and the flow is choking around the aft portion of the main nozzle members 104–106, then the arms 56 are lifted from the position of FIG. 2B up to the retracted positions where they are flush with the outer surface of the nacelle 12 of the engine assembly 10.

The position in FIG. 2B would be the one in which the engine would remain during later climb (where noise suppression is not required), supersonic cruise, and also subsonic flight where noise suppression is not required. In this operating mode, as indicated above, the variable area plug panel members 104/106 will be positioned so that there is subsonic flow upstream of the plug panel members 104/106, and supersonic flow aft of the minimum area portion of the plug elements 104/106. There is no inflow of ambient air through the air inlet openings 62, and with the arms 56 fully retracted, the primary exhaust flow is both through the ambient air passageways 44 and the primary exhaust passageways 46. Thus, the velocity of the primary exhaust flow is relatively low, and the losses resulting from flow past the acoustically treated surfaces would also be relatively low.

(iii) Thrust Reversing Mode

Reference is now made to FIG. 2C. For this mode of operation, the arms 56 are moved to an intermediate position shown in FIG. 2C. Also, the pairs of panels 104/106 are moved relative to one another so that the outer surface 120 of the plug panel members 104/106 are positioned against the inner surface 122 of the upper and lower end plates 112.

It is evident that various modifications could be made to the present invention without departing from the basic teachings thereof. For example, instead of moving the arms 56 by the actuating rods 76, other actuating means could be used, such as having the forward ends of the arms 56 being be mounted in tracks and moved in such tracks for desired movement of the arms 56. As another example, while the particular arrangement of variable area plug panels 104/106 along with the trim plates 112 are shown in a preferred configuration, other arrangement, configurations or designs could be used.

It is to be understood that various modifications could be made without departing from the basic teachings of the present invention.

What is claimed:

1. A supersonic jet engine assembly having a forward to rear longitudinal axis, a front end, and a rear end, and also providing a primary flow path from the forward end to the rear end of the engine, said engine assembly comprising:
   a. a main engine portion delivering exhaust gas at high pressure and temperature such that noise suppression is required;
   b. a rear discharge portion of said engine having a forward end to receive primary flow from a forward engine portion and a rear outlet end, said discharge portion comprising:
   c. an ambient air inlet section, comprising:
      i. a plurality of longitudinally aligned passageway plates spaced laterally from one another, with adjacent pairs of passageway plates defining flow passageways, some of said flow passageways being primary flow passageways and others of said flow passageways being ambient air passageways, said primary flow passageways and ambient air passageways being positioned in an interspersed pattern relative to one another;
      ii. a nacelle having an ambient air inlet section having ambient air inlet openings positioned and arranged to admit ambient air into said ambient air inlet section, with each of said openings admitting ambient air into a related one of said ambient air passageways;
      iii. a plurality of arms mounted at said ambient air inlet section and being moveable between a first position blocking flow of ambient air into said ambient air passageways but permitting primary flow through said ambient air passageways, and a second position permitting ambient air to flow through said ambient air inlet openings into said ambient air passageways, while at least partially blocking primary flow through said ambient air passageways;
      iv. means to move said arms between said first and second positions;
   d. a mixing section positioned behind said ambient air inlet section, and arranged to receive primary flow and ambient air inlet section, while said arms are in the second position, and to receive primary flow from said primary flow passageways and from said ambient air passageways when said arms are in the first position;
   e. a discharge section having a discharge passageway portion to receive flow from said mixing section, said discharge section having variable area passageway means arranged to vary the area of the discharge passageway portion and provide a more open position for mixed flow of ambient air and primary flow for operation in a mixed flow noise suppressing mode of operation and provide a convergent/divergent configuration for supersonic mode of operation.

2. The engine assembly as recited in claim 1, wherein each of said arms in said first position is positioned in a related inlet opening in said nacelle, each of said arms having a forward end and a rear end, each of the arms being moveable in a manner that the forward end of each arm remains adjacent to said engine nacelle, while a rear portion of each arm moves toward and away from a center location of said engine assembly.

3. The engine assembly as recited in claim 2, wherein each of said passageway plates has a leading edge that slants from a forward location further from a center location of said engine assembly inwardly toward a location closer to the center location of the engine assembly, with said arms in said second position being adjacent to the leading edges of adjacent passageway plates to divert primary flow from said ambient air passageways into said primary flow passageways.

4. The engine assembly as recited in claim 3, wherein each of said passageway plates has a rear end, said assembly further comprising means at rear edges of said passageway plates forming convergent/divergent passageways to provide choked flow of said primary flow through said primary flow passageways with said arms in said second position.

5. The assembly as recited in claim 4, wherein said means to provide choked flow comprises a plurality of plug members, each positioned adjacent to a rear end portion of a related primary flow passageway, and defining with adjacent surfaces of said passageway plates said convergent/divergent flow paths.

6. The assembly as recited in claim 5, wherein said plug elements are stationary.

7. The assembly as recited in claim 6, wherein said arms are arranged in a manner that end surface portions thereof are arranged so that with said arms being moved a short distance from said second position, a convergent/divergent passageway is defined by said arms with adjacent surfaces to permit primary flow adjacent to the arm end portions and into the ambient air passageways.

8. The assembly as recited in claim 4, wherein said arms are arranged in a manner that end surface portions thereof are arranged so that with said arms being moved a short distance from said second position, a convergent/divergent passageway is defined by said arms with adjacent surfaces to permit primary flow adjacent to the arm end portions and into the ambient air passageways.

9. The assembly as recited in claim 1, wherein said arms are arranged to be positioned in a third intermediate position between said first and second positions, wherein said ambient air passageways are partially open to primary flow, and said ambient air inlet openings are open, said assembly further comprising means to block flow of primary flow from said discharge section, so that primary flow is directed by said arms through said ambient air passageways, and out said ambient inlet openings for thrust reversal.

10. The assembly as recited in claim 1, wherein there are longitudinally aligned acoustic panels positioned in said mixing section, with each of said panels being longitudinally aligned with a related ambient air flow passageway.

11. The assembly as recited in claim 1, wherein said discharge section comprises upper and lower variable area surface means having a noise suppressing position located adjacent to a center area of said discharge section to provide a larger flow exit area and moveable outwardly from said center location to define said convergent/divergent configuration.

12. The assembly as recited in claim 11, wherein each of said surface means comprises a forward panel and a rear panel connected to one another at adjacent edge portions thereof, with each pair of panels being pivotally connected to one another to deflect from the center position to a convergent/divergent configuration.

13. The assembly as recited in claim 1, wherein each of said arms has an outer generally planar surface portion, with the arms in the first position forming an outer surface contour of said engine assembly, and a rounded inwardly facing surface which in the second position provides a leading edge with adjacent passageway panels to cause the primary flow to be directed through said primary flow passageways.

14. The engine assembly as recited in claim 1, wherein said rear discharge portion has a substantially rectangular configuration in transverse section, and said aligned passageway plates are substantially parallel to one another to define flow passageways of substantially constant width.

15. The engine assembly as recited in claim 14, wherein said rear discharge portion is arranged in upper and lower discharge sections, wherein each of said upper and lower discharge sections has said plurality of longitudinal aligned passageways, a set of ambient air inlet openings, and a plurality of arms mounted at said ambient air inlet section.

16. A method of operating and alleviating noise in a supersonic jet engine assembly having a forward to rear longitudinal axis, a front end, and a rear end, and also providing a primary flow path from the forward end to the rear end of the engine, said engine assembly comprising:

a. a main engine portion delivering exhaust gas at high pressure and temperature such that noise suppression is required;

b. a rear discharge portion of said engine having a forward end to receive primary flow from a forward engine portion and a rear outlet end, said discharge portion comprising:

i. an ambient air inlet section, comprising:

a plurality of longitudinally aligned passageway plates spaced laterally from one another, with adjacent pairs of passageway plates defining flow passageways, some of said flow passageways being primary flow passageways and others of said flow passageways being ambient air passageways, said primary flow passageways and ambient air passageways being positioned in an interspersed pattern relative to one another;

a nacelle having an ambient air inlet section having ambient air inlet openings positioned and arranged to admit ambient air into said ambient air inlet section, with each of said openings admitting ambient air into a related one of said ambient air passageways;

a plurality of arms mounted at said ambient air inlet section and being moveable between a first position blocking flow of ambient air into said ambient air passageways but permitting primary flow through said ambient air passageways, and a second position permitting ambient air to flow through said ambient air inlet openings into said ambient air passageways, while at least partially blocking primary flow through said ambient air passageways; means to move said arms between said first and second positions;

ii. a mixing section positioned behind said ambient air inlet section, and arranged to receive primary flow and ambient air flow from said ambient air inlet section, while said arms are in the second position, and to receive primary flow from said primary flow passageways and from said ambient air passageways when said arms are in the first position;

iii. a discharge section having a discharge passageway portion to receive flow from said mixing section, said discharge section having variable area passageway means arranged to vary the area of the discharge passageway portion and provide a more open position for mixed flow of ambient air and primary flow for operation in a mixed flow noise suppressing mode of operation, and provide a convergent/divergent configuration for supersonic mode of operation;

c. operating said engine assembly in a noise suppressing mode by positioning said arms in said second position to direct primary exhaust through said primary exhaust passageways while substantially blocking flow of primary flow through said ambient air passageways, and positioning said discharge section to said more open position to receive mixed flow of ambient air and primary flow;

d. for a supersonic mode of operation, positioning said arms in said first position to substantially block flow of ambient air into said ambient air passageways, and also positioning said discharge section in the convergent/divergent configuration, so that there is primary subsonic flow through both said primary flow passageways and said ambient air passageways, with said flow becoming choked in said discharge section and exiting as supersonic flow.

17. The method as recited in claim 16, wherein for thrust reversal, positioning said arms at an intermediate position, wherein said ambient air passageways are open to both primary flow and also leave the ambient air inlet openings open, and blocking primary flow through said discharge section so that primary flow is directed over said arms and through said ambient air inlet passageways to be discharged for thrust reversal.

18. The method as recited in claim 16, wherein each of said arms in said first position is positioned in a related inlet opening in said nacelle, each of said arms having a forward end and a rear end, moving each of the arms in a manner that the forward end of each arm remains adjacent to said engine nacelle while a rear portion of each arm moves toward and away from a center location of said engine assembly.

19. The method as recited in claim 16, wherein each of said passageway plates has a rear end, said method further comprising providing means at rear edges of said passageway plates to form convergent/divergent passageways to provide choked flow of said primary flow through said primary flow passageways with said arms in said second position.

20. The method as recited in claim 19, further comprising positioning arms in a manner that end surface portions thereof are a short distance from said second position, so that a convergent/divergent passageway is defined by said arms with adjacent surfaces to permit primary flow adjacent to the arm end portions and into the ambient air passageways.

* * * * *